Patented Oct. 14, 1930

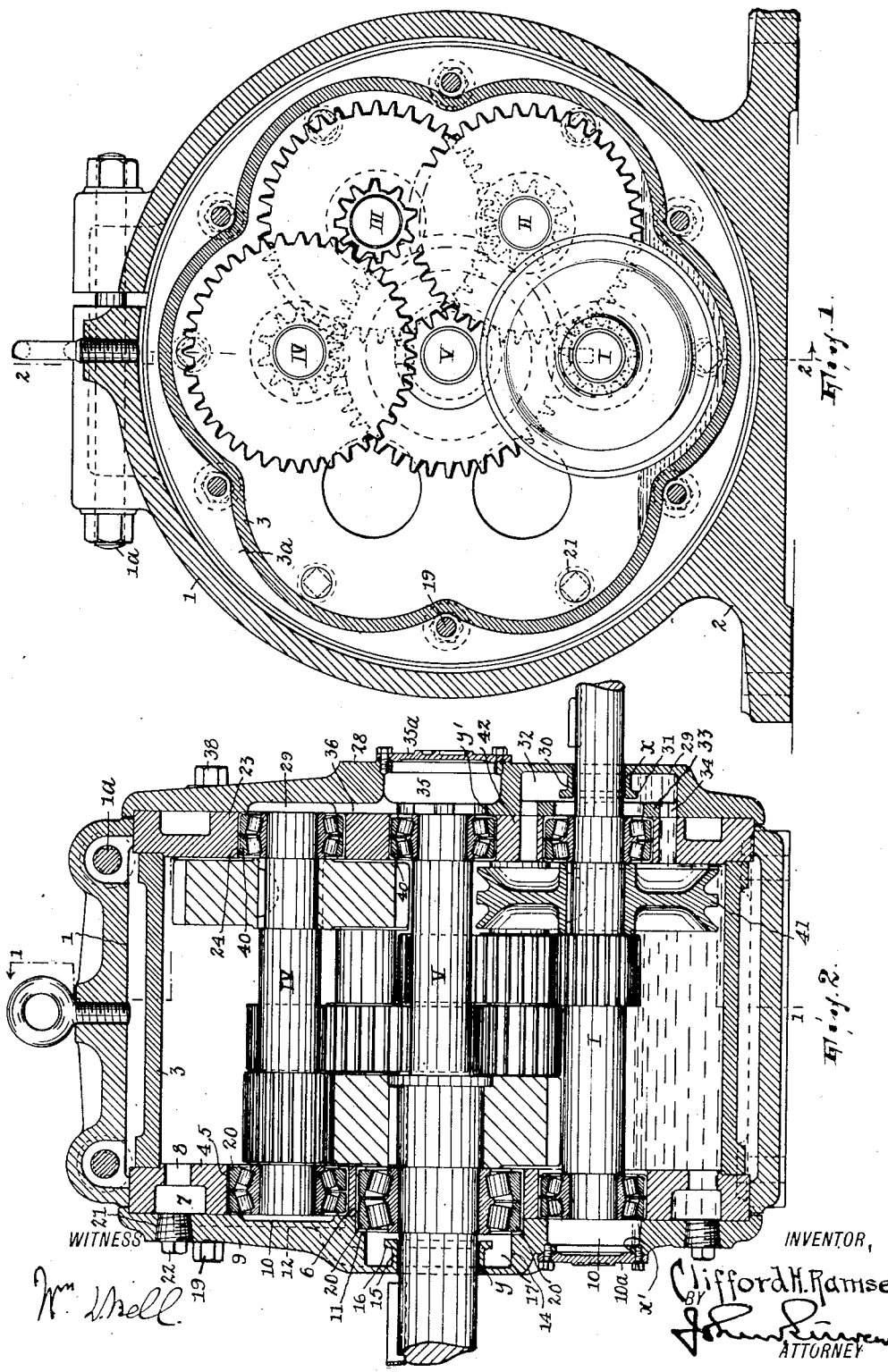

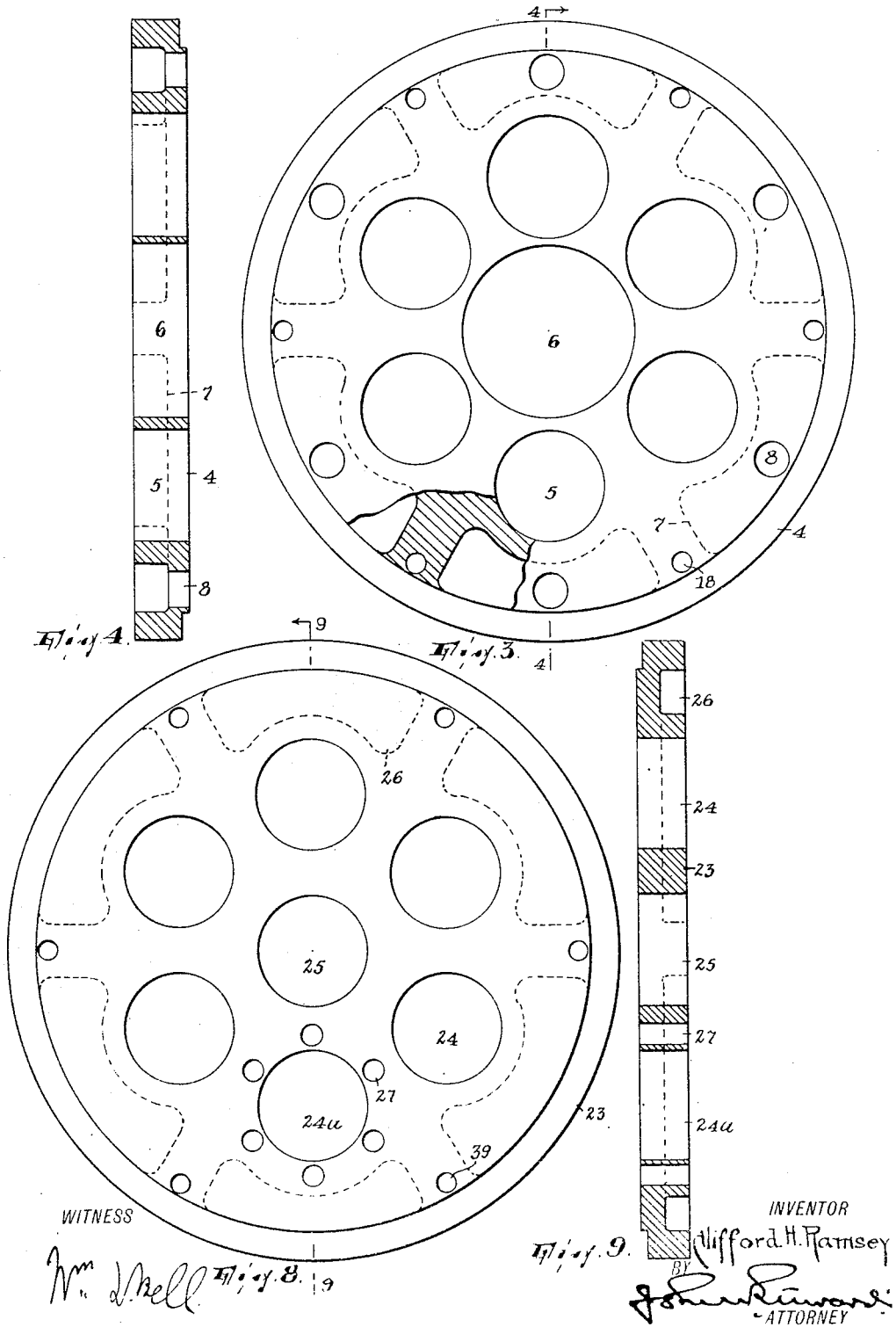

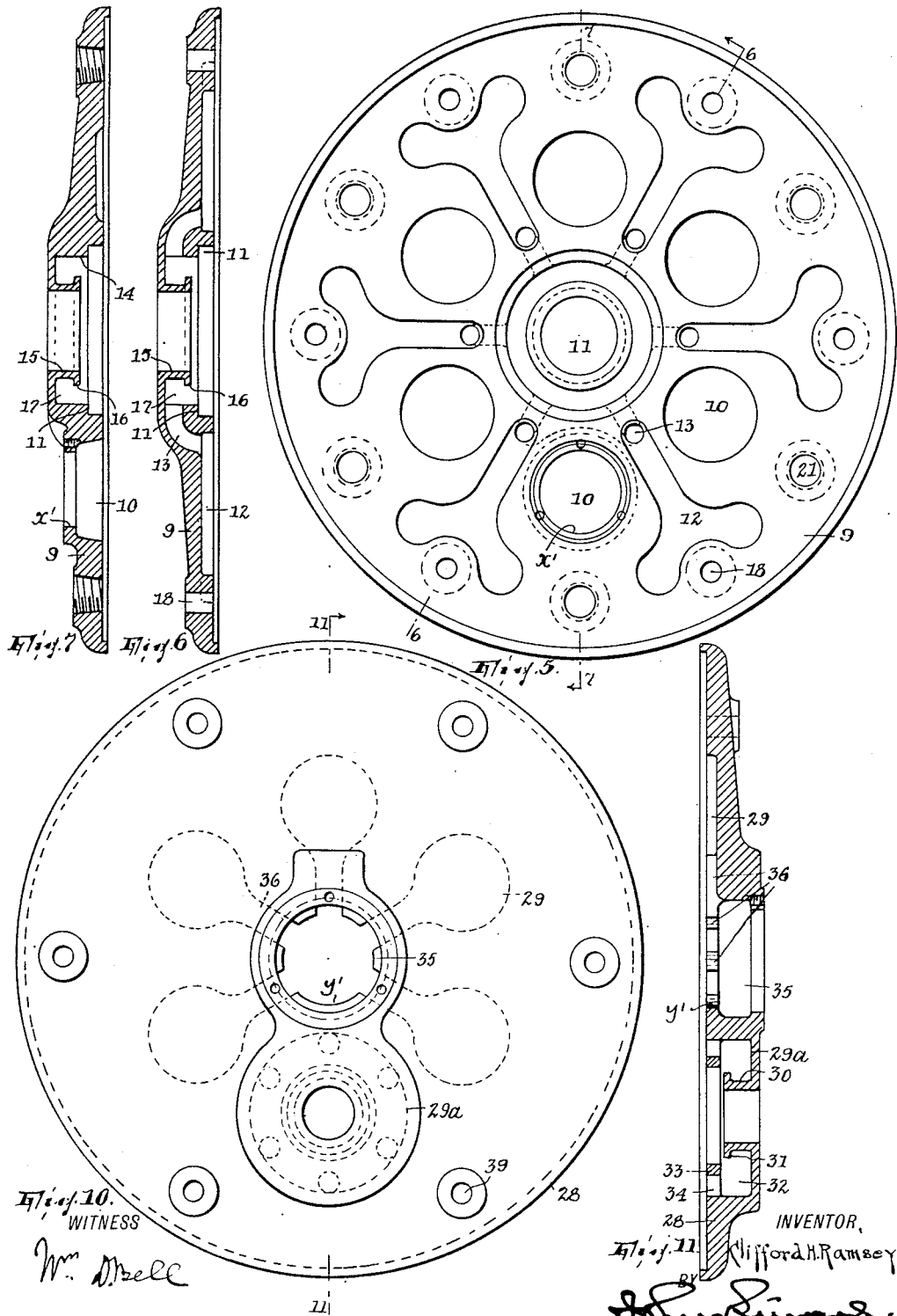

1,778,432

UNITED STATES PATENT OFFICE

CLIFFORD H. RAMSEY, OF GLEN ROCK, NEW JERSEY

LUBRICATING SYSTEM

Application filed October 15, 1928. Serial No. 312,485.

This invention relates to the lubrication of mechanism having certain characteristics of the speed-changing units set forth in my Patent No. 1,393,906 and my pending application Serial No. 240,706 now Patent No. 1,728,279 in which a casing or hollow support is revolubly shiftable around a central horizontal axis passing therethrough and the casing contains intergeared members journaled on horizontal axes for connecting the driving or input with the driven or output shaft. The objects of the invention are to provide for thorough lubrication of all surfaces requiring to be lubricated; to prevent escape of lubricant from the casing at points where the shafts protrude from it without the use of stuffing boxes or glands or other expedients which oppose resistance to their rotation if adequately tight and in certain applications of the unit exist as objectionable protuberances; to limit the charging of the casing with the lubricant below that level where, with either shaft the lower, its point of protrusion would be more or less submerged and permit visible ascertainment of the level of the lubricant on introducing the same or at any time; and to obtain by a certain unique circulation of the lubricant the clearing of all bearings of grit and other foreign particles. How these objects are attained will hereinafter appear; but first describing in detail the structure shown by way of example in the accompanying drawings, in which, Fig. 1 is a section on line 1—1, Fig. 2;

Fig. 2 a section on line 2—2, Fig. 1;

Figs. 3 to 7 show the two sections of the left-hand end-wall of the casing, Figs. 3 and 5 being elevations of its head and disk sections, Fig. 4 being a section on line 4—4, Fig. 3, and Figs. 6 and 7 sections on lines 6—6 and 7—7 sections of Fig. 5; and Figs. 8 to 11 show the two sections of the left-hand end-wall of the casing, Figs. 8 and 10 being elevations of its head and disk sections and Figs. 9 and 11 sections on lines 9—9 and 11—11, respectively, of Figs. 8 and 10.

Let 1 represent a band provided with clamping bolts 1ª and having a base 2 and in which the casing is rotatively shiftable around the axis of its generally cylindrical but here fluted shell 3, which is closed at both ends by the end walls to be described and therefore gives the casing a liquid-tight character. Substantially as in my said application gear elements I, II, III and IV (there may be more or less) are journaled in the end walls in a more or less complete circular series concentric with said axis, with another gear element V having its shaft journaled in said end walls coincident with said axis, all these elements forming an intergeared system or train. The shafts of elements I and V are here taken as the input and output shafts, respectively.

I may here state that it is contemplated that the casing may and usually will be filled with liquid lubricant so that its normal level (i. e., when quiescent) will not permit its overflowing at the point where, whichever of the two shafts, input or output, happens to be the lower (in the rotative shifting of the casing to any given position to adapt the unit to the two shafts—motor or delivery and receiving shafts—to be connected and arranged at different elevations), such lower shaft penetrates an end wall of the casing. That is, if shaft I is the lower, then such normal level must not exceed that where there would be overflow at $x$ in Fig. 2, and if shaft V is the lower then such normal level must not exceed that where there would be overflow at $y$ in said figure. Next, that there must be provision for preventing escape of the lubricant at these points as any incident of the mere agitation thereof by the internal mechanism, and this regardless of the position to which the casing, with such mechanism, may be rotatively shifted, and notwithstanding the absence of tight or material friction-producing seals at said points and the fact that a part of the gearing in the actual example rotates at high speed—to wit, as between shafts I and V in the ratio of 1200 R. P. M. to 14+ R. P. M.

As per the example shown, it is convenient to form each end wall of the casing in two sections, to wit, a circular head and a disk, or as follows:

*Left-hand end wall.*—The head 4 has, arranged in a circle concentric therewith and equally spaced, the openings 5, and a central opening 6; and segmental pockets 7 radially outward of openings 5 and formed in its outer face, and leading thereto from its inner face ports 8. The disk 9 has in its inner face, arranged to coincide with openings 5 and opening 6 in the head, the recesses 10 and the central recess 11, and it also has in said face the Y-shaped channels 12 the bifurcated (outer) portion of each of which, when the disk and head are assembled, overlaps the adjoining ends of two of the pockets 7 in the head, and the inner end of which terminates in an elbow-port 13; and said disk also is centrally apertured, as at 14, and reaching inwardly into said aperture it has an apertured integral bushing or neck 15 having a circumferential drip-lip 16, an annular chamber being formed at 17. Holes 18 in the head and disk receive screws 19 for securing them in the relation stated (see Figs. 1 and 2) to the flange 3ª of shell 3. The openings 5—6 and recesses 10—11, when the head and disk are thus assembled, form housings which receive shafts I to V, and in them, abutting the disk may be anti-friction bearings 20 for the shafts. The bottom of the recess 10 for shaft I may be a removable cover 10ª (Fig. 2), since at this point a sight-opening is desired for use when filling the casing with lubricant up nearly to level $x$. Opposite each pocket 7 disk 9 has a lubricant filling and drain hole 21, with a removable closure (screw plug) 22.

The violent action of the mechanism causes the lubricant to be thrown upwardly and about within the casing and since it is free to flow through the bearing for shaft V it would naturally be in order for it to leak from the casing where this shaft penetrates neck 15 were it not for the interposing of the annular chamber 17 and the existence of the channel 12 and pockets 7 (or it may perchance be two channels and one pocket, according to the rotative position of the casing), which channels and pockets afford adequate lubricant-conducting means for returning the lubricant downward and back to the interior of the casing. This result follows in any position to which the casing may be rotatively shifted, because the passages are radial to chamber 17 or in spider formation, and regardless of whether the position of the casing is such that the lubricant may be and has been filled even near to the level $y$, and also regardless of the speed of the mechanism and whether the neck receives the shaft closely or with appreciable clearance, though a close enough fit for exclusion of dust is preferred. Lubricant entering those passages which in any position of the casing happen to extend up from the chamber 17 of course drains down to said chamber and back into the casing as described; but it is prevented from draining onto the shaft, since the neck 15, to (or from) which each passage leads radially, intervenes. Leakage where the shaft V penetrates the mentioned end wall is so completely prevented that large use of my units in practice has shown that after long-continued running there will hardly be a smear of lubricant on the protruding part of the shaft.

*Right-hand end wall.*—Head 23 has, arranged in a circle concentric therewith and equally spaced, the openings 24, and a central opening 25; and segmental pockets 26 radially outward of openings 24 and formed in its outer face (these pockets having no function other than to lighten the casing). That one, 24ª, of the circular series of openings which is to receive shaft I as shown has around it a series of equally spaced ports 27 penetrating the head. The disk 28 has in its inner face, arranged at equally spaced points in a circle concentric therewith, recesses 29, and to coincide with opening 24ª it has a recess 29ª provided with a central inwardly reaching apertured bushing or neck 30 having a circumferential drip-lip 31, an annular chamber being formed at 32, said recess 29ª also having a grid-like flange 33 at its mouth whose ports 34 are equally spaced around its aperture. The disk also has a central recess 35 and formed in its inner face and connecting recesses 35 and 29 channels 36 arranged in spider formation. When the disk and head are assembled with the shell, by screws 38 penetrating holes 39 in them, the openings 24—24ª—25 respectively coincide with recesses 29—29ª—35, and form therewith housings which receive the shafts I to V and in them, abutting the disk, may be anti-friction bearings 40 for the shafts. The bottom of recess 35 for shaft V may be a removable cover 35ª (Fig. 2), where a sight-opening is desired. Considering, first the matter of prevention of leakage at the point where shaft I penetrates the right-hand end wall, a wheel 41 is arranged on said shaft between the gearing and the said housing for this shaft; it forms a baffle protecting the housing from the surge of the lubricant body into it, and if, as preferred, it is fixed to rotate with the shaft, it acts also as a lubricant distributor, its periphery being composed of three flanges, of which the two lateral ones are reversely conical for dispersing the lubricant to right and left.

As for prevention of leakage at the point where the shaft I penetrates the right-hand end wall, the most likely leakage possibility is when that shaft is the lowest in the group and is attributable to sudden surgings of the lubricant body to the right. The lubricant is prevented from in this way reaching said point and leaking out by the barrier which is here formed by the perforated flange 33 and also by the baffle (though it may be by either of them) both of which, while they permit retarded flow to right and left, being opposite and relatively near said point, maintain the lubricant in the intervening space substantially quiescent. The bearing for shaft I in the example intervenes between the barrier and said point; and instead of connecting it with or abutting it against this point (as against neck 30), which might permit lubricant that enters the bearing, as that draining down the inner face of the end wall, to leak out, I leave a certain clearance or space between them (Fig. 2). Of course whenever shaft I is not the lowest in the group the extreme condition assumed does not exist; such lubricant as then, draining down the inner surface of the end wall, enters chamber 32 via the bearing or some of the ports 34 finds return to the casing via the then lowest ports 34. As will hereinafter appear, channels 36 are in part present for visually determining the filling limit when shaft I is not the lowest; and to prevent lubricant that enters them via the housings for shafts II to V when shaft I is the lowest from overcharging chamber 32 and so producing possible leakage-flooding at neck 30 another barrier 42 exists between the housing for shaft I and that for shaft V into which latter all such channels debouch. The identical result occurs as to prevention of leakage where shaft I protrudes, as it has been stated, occurs where shaft V protrudes and under all conditions as to rotative position of the casing and speed of the unit and though the neck may receive the shaft with appreciable clearance.

*Limiting and determining the liquid level.*—When shaft I is the lowest of the group the level to which the casing can be filled with lubricant without overflow at neck 30 is limited by the lip $x'$ of the (circular) orifice at the bottom of that recess 10 which has the removable cover 10$^a$, said orifice being alined with the shaft or concentric with and also of greater diameter than the bore of the neck. When shaft V is the lower of shafts I and V the level to which the casing can be filled with lubricant without overflow at neck 15 is limited by the lip $y'$ of the circular orifice at the bottom of recess 35, said orifice being alined with the shaft or concentric with and also of greater diameter than the bore of said neck. This part of my invention contemplates a liquid lubricant-containing casing, in combination with a rotary means contained therein and adapted to be lubricated by the lubricant in the casing and having a shaft rotating on a substantially horizontal axis and protruding through a wall forming one side of the casing and also having in a wall forming the relatively opposite side of the casing a closured orifice alined with the shaft and concentric with and of greater diameter than the opening in the first wall through which said shaft protrudes.

The proper level, when shaft I is the lowest, is visually determinable by removing cover 10$^a$, and when shaft V is the lower of shafts I and V by removing cover 35$^a$, and in the latter case the level for this purpose is permitted to rise into sighting range by the channels 36, this being a principal function of such channels. Such channels are unnecessary at the orifice covered by cover 10$^a$ where the lip $x'$ is spaced from the adjoining bearing and so permits the lubricant to be seen.

Another feature which I wish to claim is that a circulation, binary in character, occurs by which the bearings at both ends of any shaft are cleared of grit or other foreign particles. When the unit is operating the lubricant is in effect showered violently upward in all directions, some of course entering each bearing housing either directly or by draining down the inner face of the corresponding end wall until it reaches the bearing: on entering any housing it may pass through the same into the passages formed therein by the openings, recesses, ports and channels described and thereby return to the main lubricant body.

Having thus fully described my invention, what I claim is:

1. In combination, a liquid lubricant-containing casing and rotary means therein adapted to stand immersed in the lubricant and having parts thereof revoluble on substantially horizontal axes, said casing having, open into the interior thereof and formed in a wall thereof which is penetrated by said axes, housings into which said parts extend and in which they are journaled and having in said wall lubricant-conducting passage means connecting the respective housings with each other.

2. In combination, a liquid-lubricant-containing casing and rotary means therein adapted to stand immersed in the lubricant and having parts thereof revoluble on substantially horizontal axes and arranged with some of them around one of them, said casing having, open into the interior thereof and formed in a wall thereof which is penetrated by said axes, housings into which all said parts extend and in which they are journaled and having in said wall spider-formed lubricant-conducting passage means connecting the housings with each other.

3. A liquid-lubricant-containing casing, in combination with rotary means contained therein and adapted to stand immersed in and be lubricated by the lubricant in the casing and having a shaft rotating on a substantially horizontal axis and protruding through a wall of the casing, said wall having a bearing for the shaft and a chamber around the shaft exterior of and open toward the bearing and lubricant-conducting passages arranged in spider formation and leading from said chamber to the interior of the casing.

4. A liquid-lubricant-containing casing, in combination with rotary means contained therein and adapted to stand immersed in and be lubricated by the lubricant in the casing and having a shaft rotating on a substantially horizontal axis and protruding through a wall of the casing and said wall having a bearing for the shaft and an annular chamber around the shaft exterior of and open toward the bearing and a neck separating said chamber from the shaft and a substantially radial lubricant-conducting passage leading from said chamber radially opposite the neck to the interior of the casing.

5. A unit of the class described comprising, with a casing adapted to contain a liquid lubricant body, a rotary means contained in the casing and adapted to stand immersed in said body and be thereby lubricated and having a shaft rotating on a substantially horizontal axis and protruding through a wall of the casing, said casing having a bearing inward of the point where the shaft so protrudes and outward of the bearing, a barrier arranged to be immersed in said body and permitting past itself limited sub-surface flow of said body.

6. A liquid-lubricant-containing casing, in combination with a rotary means contained therein and adapted to be lubricated by the lubricant in the casing and having a shaft rotating on a substantially horizontal axis and protruding through a wall forming one side of the casing, said casing having in a wall forming the relatively opposite side of the casing a closured opening alined with the shaft and concentric with and of greater diameter than the opening in the first wall through which the shaft protrudes and also having in said wall spider-formed lubricant passage means extending from said opening to the interior of the casing.

7. In combination, a liquid-lubricant-containing casing and rotary means therein adapted to stand immersed in the lubricant and having parts thereof revoluble on substantially horizontal axes, said casing being adapted to be shifted around a horizontal axis to bring either of said parts to a higher elevation than the other and having, open into its interior and formed in a wall thereof which is penetrated by said axes, housings into which said parts extend and in which they are journaled and also having in said wall lubricant-conducting passage means connecting the housings with each other.

8. In combination, a liquid-lubricant-containing casing and rotary means therein adapted to stand immersed in the lubricant and having parts thereof revoluble on substantially horizontal axes and arranged one between two other such parts and also protruding from a wall of the casing, said casing being adapted to be shifted around a horizontal axis to bring either of said two other parts to a higher elevation than the other of them and having, open into its interior and formed in said wall thereof, housings into which said two other parts extend and in which they are journaled and also having in said wall and open into the interior of the casing a chamber formed around that one of said parts which protrudes from said wall, and said casing also having in said wall lubricant-conducting passage means connecting said housings with said chamber.

In testimony whereof I affix my signature.
CLIFFORD H. RAMSEY.